United States Patent [19]

Lew

[11] 4,094,616
[45] June 13, 1978

[54] STEAM-HEATER-PUMP

[76] Inventor: Hyok Sang Lew, 7890 Oak St., Arvada, Colo. 80005

[21] Appl. No.: 763,029

[22] Filed: Jan. 27, 1977

[51] Int. Cl.² ............................ F04F 1/10; F04F 1/12; F04F 1/14; F04F 1/18
[52] U.S. Cl. .................................. 417/121; 417/122; 417/147; 417/207; 417/900
[58] Field of Search ............... 417/900, 118, 119, 207, 417/86, 121, 122, 147

[56] References Cited
U.S. PATENT DOCUMENTS

| 2,932,287 | 4/1960 | Goetz | 417/119 X |
| 3,894,814 | 7/1975 | Morgan | 417/121 |

FOREIGN PATENT DOCUMENTS 460,434  11/1959  Italy ...................................... 417/121

Primary Examiner—William L. Freeh
Assistant Examiner—R. E. Gluck

[57] ABSTRACT

A device using only steam to simultaneously heat and pump a liquid or a slurry to a high pressure is disclosed, which device does not employ any rotating or reciprocating mechanisms commonly employed in the conventional pumping machinery. The combined use of steam for the simultaneous heating and pumping enables the outstanding device to utilize 100 percent of the steam supplied to the device in either pumping or heating. The simple structure and operational principle of said device results in particularly low capital cost and trouble-free operation.

5 Claims, 2 Drawing Figures

STEAM-HEATER-PUMP

In many mineral and chemical processing industries, the material is processed under high pressure and high temperature to obtain a favorable thermodynamic condition for the required chemical reaction. Most materials processed in the mineral and chemical industries are slurries, which are viscous and abrasive. As a consequence, pumping of such slurries provides a serious challenge and problem in terms of engineering technology and the economy of the plant operation.

The primary object of the present invention is to provide a device that simultaneously heats and pumps the liquid or slurry by using steam only.

An another object of the present invention is to provide a pump having a pumping efficiency approaching 100 percent.

A further object of the present invention is to provide a pump that can operate trouble-free at high temperature and high pressure.

Still another object is to provide a pump that can handle a highly corrosive, abrasive and viscous slurry.

These and other objects of the present invention will become clear as the description and specification of the present invention proceeds.

Figure 1:
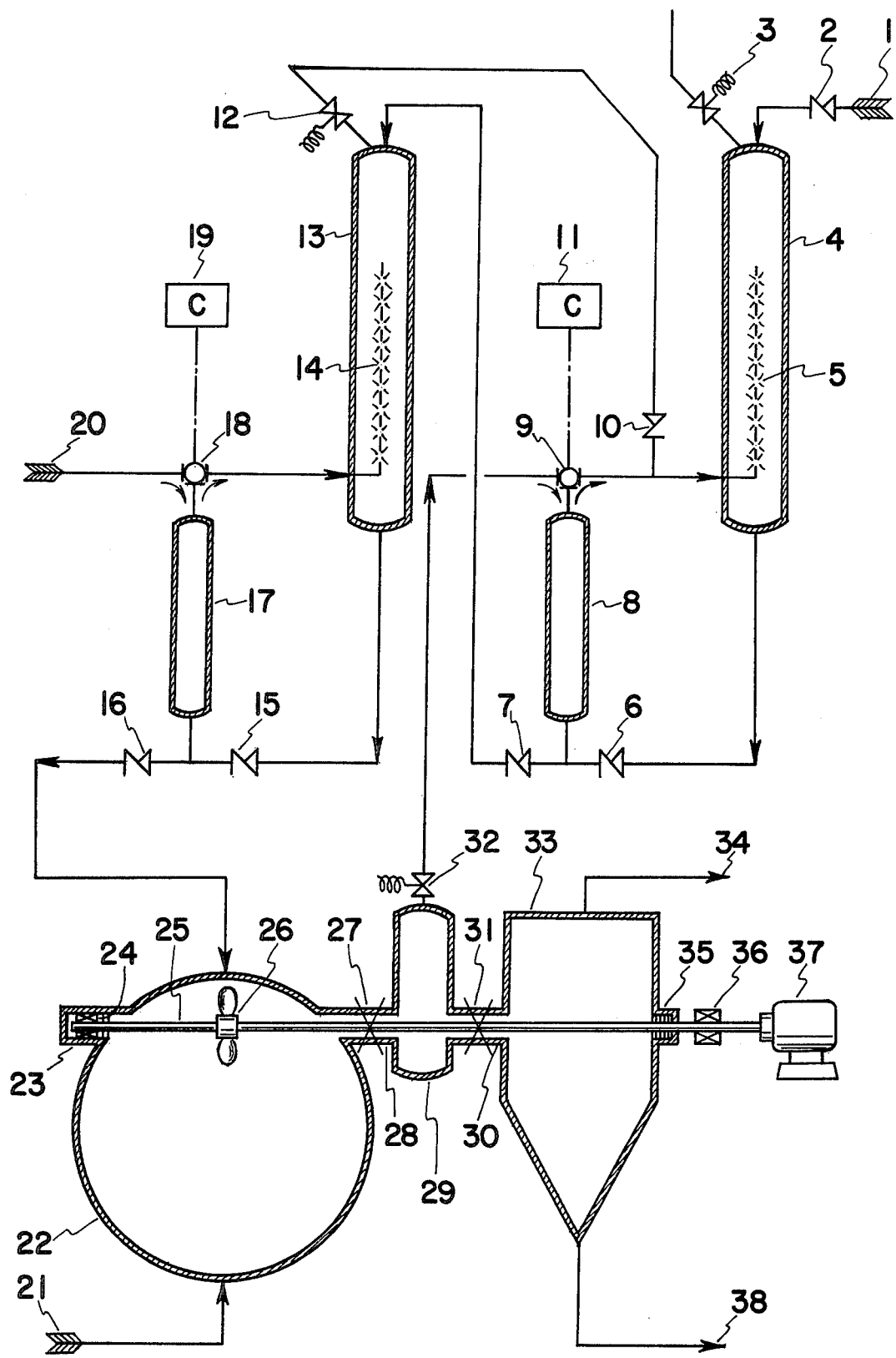
FIG. 1 is a schematic illustrating the principle of the present invention in conjunction with a typical processing arrangement in a mineral or chemical processing plant.

The slurry to be heated and pumped into a high pressure and high temperature chemical reactor vessel 22 is fed from an inlet 1 to a heating tower 4. The flow of the slurry into heating tower 4 is achieved by an elevated slurry tank or a low pressure mechanical pump. A check valve 2 prevents the back flow of the slurry while steam is injected into heating tower 4 through a steam injector pipe 5 having a series of steam outlets disposed along its length. The heating tower 4 is connected to a pumping cylinder 8 by a pipe with a check valve 6 that prevents the back flow of slurry from the pumping cylinder 8 to heating tower 4.

The pumping cylinder 8 has another check valve 7 on the slurry outlet preventing the back flow of slurry into pumping cylinder 8. It should be understood that pumping cylinder 8 is disposed vertically and the slurry inlet-outlet is disposed on the bottom of pumping cylinder 8. On the top of the pumping cylinder, a steam inlet-outlet is disposed. The injection and discharge of the steam is controlled by a controller 11 that operates a three port valve 9, which valve, when turned to the injection position, allows the steam to enter a pumping cylinder 8 and, when turned to the vent position, lets the steam in the pumping cylinder discharge into heating tower 4 while closing the steam supply port.

When three port valve 9 is turned to the vent position by controller 11, the steam in a pumping cylinder 8 is vented into a heating tower 4 and, consequently, the pressure in a pumping cylinder 8 becomes the same as that in the heating tower 4 almost instantaneously. The heating tower 4 is disposed at a higher elevation than pumping cylinder 8. Therefore, the weight of the slurry in heating tower 4 starts pushing the slurry from heating tower 4 into pumping cylinder 8 as soon as three port valve 9 is turned to the vent position. During this filling period of the slurry into pumping cylinder 8, the pressures in heating tower 4 and in pumping cylinder 8, which are the same, drop rapidly as the vented steam injected into the slurry in heating tower 4 condenses. When pumping cylinder 8 is filled with slurry, controller 11 turns port valve 9 to the injection position which lets the steam rushed into pumping cylinder 8 while closing the vent port of the three port valve. The steam forced into pumping cylinder 8 pushes out the slurry through check valve 7 at high pressure. At this moment, all or most of the steam vented into heating tower 4 from pumping cylinder 8 is condensed and the pressure in heating tower drops below the supply slurry pressure entering 1 and, consequently, fresh slurry moves into heating tower 4. When a sufficient amount of steam is injected into pumping cylinder 8 and all the slurry is pushed out of pumping cylinder, controller 11 turns three port valve 9 to the vent position and thus, starts the repeats of the cycle described above.

The novelty and advantage of the "Steam-Heater-Pump" of the present invention can be more keenly appreciated when the operation of the present invention is described in conjunction with a typical working plant. In such an embodiment shown in FIG. 1, the slurry pumped and heated by a "Steam-Heater-Pump" comprising of heating tower 4 and pumping cylinder 8 is fed to a second "Steam-Heater-Pump" comprising of heating tower 13 with steam injecting pipe 14 and pumping cylinder 17 with the three port valve 18 controlled by controller 19. The check valves 15 and 16 play the same role as check valves 6 and 7, respectively. The slurry further heated and pressurized by the second "Steam-Heater-Pump" is fed into a horizontal cylindrical reactor vessel 22, in which the slurry is mixed and reacted with chemical agents fed through pipe 21. The reactor vessel 22 has an agitation propeller 26 mounted on a shaft 25, which shaft is supported by a bearing 24 enclosed within a blind flange 23 at one end and by another bearing 36 disposed outside at the driving end, which end is connected to a driving motor 37. The reactor vessel 22 is connected to a flashing vessel 29 by a spool 28. In turn, the flashing vessel 29 is connected to another flashing vessel 33 by another spool 30. Within each of the spools 28 and 30, chokes 27 and 31 are disposed, respectively, comprising of a narrow passage for the slurry through the annular gap between the shaft and the spool. In general, it is necessary to have abrasion resisting lining on the surfaces of the shaft and spool forming the choke. The slurry leached in reactor vessel 22 is discharged into flashing vessel 29 through choke 27, which maintains the pressure in flashing vessel 29 sizably lower than the pressure in reactor vessel 22, which low pressure in turn creates evaporation and produces steam in flashing vessel 29. The slurry with partially stripped steam in flashing vessel 29 is further flashed into the atmospheric pressure flashing vessel 33 through another choke 31, where steam is released through pipe 34 and the cooled slurry is discharged through pipe 38 connected to the cone bottom of flashing vessel 33. The shaft 25 run through both spools 28 and 30 and comes out through the wall of the atmospheric flashing vessel 33. With this arrangement, the agitation of the pressurized reactor vessel can be done mechanically without using any mechanical seal. The low pressure packing 35 is disposed on the wall of the atmospheric flashing vessel 33 to prevent the fumes from leaking out. However, there is little pressure difference across such a packing 35 and, consequently, no elaborate sealing is necessary.

Figure 2:
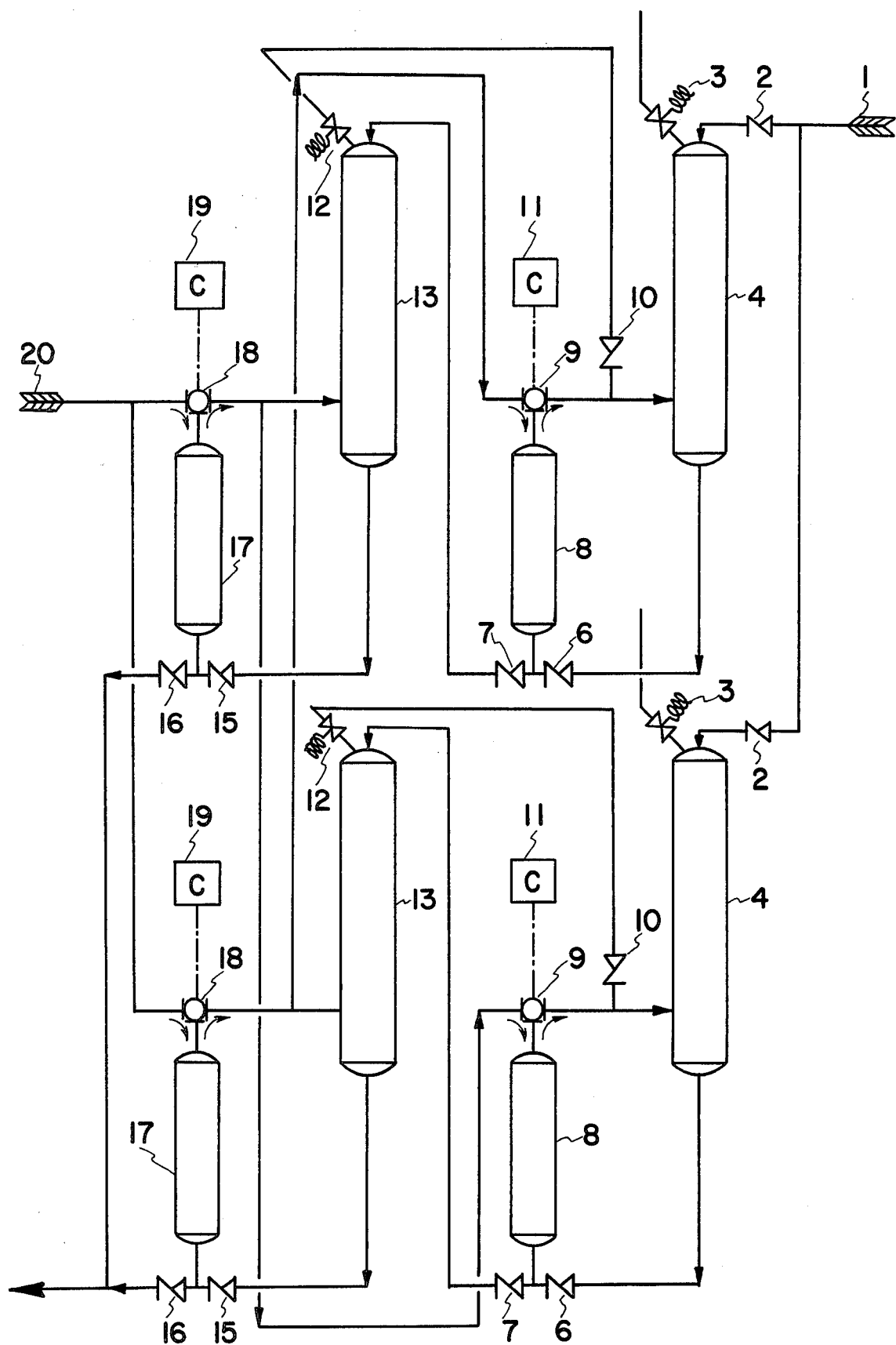
FIG. 2 shows a parallel installation of steam-heater-pumps.

In FIG. 2, there is shown a parallel installation of two series of the Steam-Heater-Pump, wherein the first stage of one series is operated by the steam discharged from the second stage of other series. In this configuration of the parallel arrangement, two different series are actuated alternatively.

It should be noticed that the first "Steam-Heater-Pump" comprising of heating tower 4 and pumping cylinder 8 is driven by the steam recovered from the leached slurry in flashing vessel, while the second "Steam-Heater-Pump" comprising heating tower 14 and pumping cylinder 17 is driven by the make-up steam supplied from pipe 20. This illustrates the possibility of recycling the steam recovered from the leached slurry for direct use to heat and pump the fresh slurry into the leaching vessel, which possibility is made possible by the principle of the present invention. Such a method of recovering and recycling the energy from the effluent stream of a processing plant is particularly important in this time of energy insufficiency.

It is not difficult to understand that two or more "Steam-Heater-Pumps" installed in series can be operated in identical phase, i.e., all three port valves are turned in unison, or in different phases. It is also readily recognized that it may be desirable to install more than one train of "Steam-Heater-Pumps" in parallel and operate each train at a different phase so that the continuous steam flow from the steam supply (especially the recycled steam) is maintained. It should be mentioned the cycles of the "Steam-Heater-Pump" can be accelerated by bleeding excessive steam pressure in the heating tower by employing a pressure relief valve as shown by those 12 and 3 in FIG. 1 or by employing a sequentially operated valve programmed to bleed the excessive steam pressure in the heating tower just before the slurry starts to refill the heating tower. Such arrangements increase the pumping capacity of the "Steam-Heater-Pump", but it is detrimental in utilizing energy more efficiently. It should be understood that, by increasing the size of the heating tower and decreasing the time rate of cycles of the pumping, it is always possible to make one hundred percent of the steam supplied to a "Steam-Heater-Pump" become utilized in either pumping or heating.

While the principles of the invention have now been made clear in an illustrative embodiment, there will be immediately obvious to those skilled in the art many modifications of structures, arrangement, proportions, the elements, materials and components used in the practice of the invention which are particularly adapted for specific environments and operating requirements without departing from those principles.

I claim:

1. A device which heats and pumps a liquid or slurry, said device comprising:

a. an uprightly disposed pumping cylinder,
   b. a heating tower disposed at a higher elevation than said pumping cylinder, said heating tower including, a cylindrical container and conduits for injecting and distributing pressurized steam into a liquid or slurry contained in said cylindrical container,
   c. a first pipe originating from the bottom of said heating tower and terminating at the bottom of said pumping cylinder, said first pipe having a check valve; whereby, a liquid or slurry in said heating tower may flow into said pumping cylinder, but not in reverse direction,
   d. a second pipe with a check valve originating from the bottom of said pumping cylinder, whereby, a liquid or slurry in said pumping cylinder may be pushed out through said second pipe, but prohibited to flow back into said pumping cylinder,
   e. a three port valve with first port connected to a pressurized steam supply line, second port connected to the top of said pumping cylinder and third port connected to said conduits for injecting and distributing steam into said cylindrical container of said heating tower, and
   f. a valve controller operating said three port valve in such a way that said third port becomes shut when said first port is open to said second port, and said first port becomes shut when said second port is open to said third port; whereby, firstly the pressurized steam directed into said pumping cylinder pumps out a liquid or slurry in pumping cylinder through said second pipe and secondly, when the steam directed into said pumping cylinder is bled into said heating tower, a liquid or slurry in said heating tower heated by condensing steam flows into said pumping cylinder by the gravity force, said heating tower becomes refilled with a fresh liquid or slurry when the steam pressure in said heating tower vanishes as the result of condensation during the period of pumping of the liquid or slurry out of said pumping cylinder by said steam injection.

2. The device as set forth in claim 1 wherein a check valve is disposed on a liquid feed line to said heating tower; whereby, the back flow of liquid or steam is prevented while the pressurized steam is bled from said pumping cylinder into said heating tower.

3. The device as set forth in claim 1 wherein a steam bleeding valve is disposed onto said heating tower, said steam bleeding valve bleeds portion of steam injected into said heating tower from said pumping cylinder, whereby, the reduced steam pressure in said heating tower accelerates the refill of the fresh liquid into said heating tower.

4. The device as set forth in claim 1 wherein two or more of said devices are disposed in series.

5. The device as set forth in claim 1 wherein two or more of said devices are disposed in parallel.

* * * * *